United States Patent [19]
Hunt

[11] 3,970,410
[45] July 20, 1976

[54] ROTARY ACTUATORS SUITABLE FOR BLADED ROTORS

[75] Inventor: John Owen Hunt, Hucclecote, England

[73] Assignee: Dowty Rotol Limited, Gloucester, England

[22] Filed: Mar. 29, 1974

[21] Appl. No.: 456,209

[30] Foreign Application Priority Data

Apr. 18, 1973 United Kingdom............... 18709/73

[52] U.S. Cl..................................... 416/154; 92/27; 416/46; 416/157 A

[51] Int. Cl.[2] .......................................... B64C 11/40

[58] Field of Search................ 416/157 A, 153, 154, 416/46; 92/122, 23, 24, 27, 121

[56] References Cited

UNITED STATES PATENTS

| | | | |
|---|---|---|---|
| 2,379,302 | 6/1945 | Hoover | 416/154 |
| 2,412,923 | 12/1946 | Stevenson | 416/157 A X |
| 2,702,602 | 2/1955 | Van Ommeren | 416/158 |
| 2,781,027 | 2/1957 | Henry | 92/122 |
| 2,882,975 | 4/1959 | Hirsch et al. | 416/154 |
| 2,957,528 | 10/1960 | Flaugh et al. | 416/154 |
| 3,003,567 | 10/1961 | Flaugh et al. | 416/46 |
| 3,087,554 | 4/1963 | Conn et al. | 416/46 |
| 3,286,602 | 11/1966 | Butner et al. | 92/28 |
| 3,379,100 | 4/1968 | Rumsey et al. | 92/27 |
| 3,635,584 | 1/1972 | Chilman et al. | 416/48 |
| 3,664,763 | 5/1972 | Chilman | 416/157 |
| 3,720,060 | 3/1973 | Davies et al. | 415/79 X |
| 3,766,831 | 10/1973 | Yeakley | 92/2 |

FOREIGN PATENTS OR APPLICATIONS

| | | | |
|---|---|---|---|
| 491,923 | 4/1953 | Canada | 416/154 |
| 1,272,726 | 7/1968 | Germany | 416/157 A |
| 567,710 | 2/1945 | United Kingdom | 416/157 A |
| 883,847 | 12/1961 | United Kingdom | 416/154 |
| 214,726 | 8/1968 | U.S.S.R. | 416/158 |

*Primary Examiner*—Everette A. Powell, Jr.
*Attorney, Agent, or Firm*—Young & Thompson

[57] ABSTRACT

A rotary actuator includes two relatively-rotatable main actuator components, abutment means being carried by the first component and displaceable axially with respect thereto, and further abutment means being carried by the second component. Holding means is operable for holding the displaceable abutment means out of engagement with respect to the further abutment means whereby relative rotational movement between the components occurs when one of them moves in either one of its two directions of rotation. Controlling means is operative, with the holding means inoperative, for urging the displaceable abutment means into engagement with the further abutment means at any relative rotational position of the components. Such engagement prevents relative rotational movement of the components as would otherwise occur with movement of the one component in one of its two directions, and permits relative rotational movement of the components arising from movement of the one component in the other of its two directions.

9 Claims, 4 Drawing Figures

ROTARY ACTUATORS SUITABLE FOR BLADED ROTORS

Figure 1A:
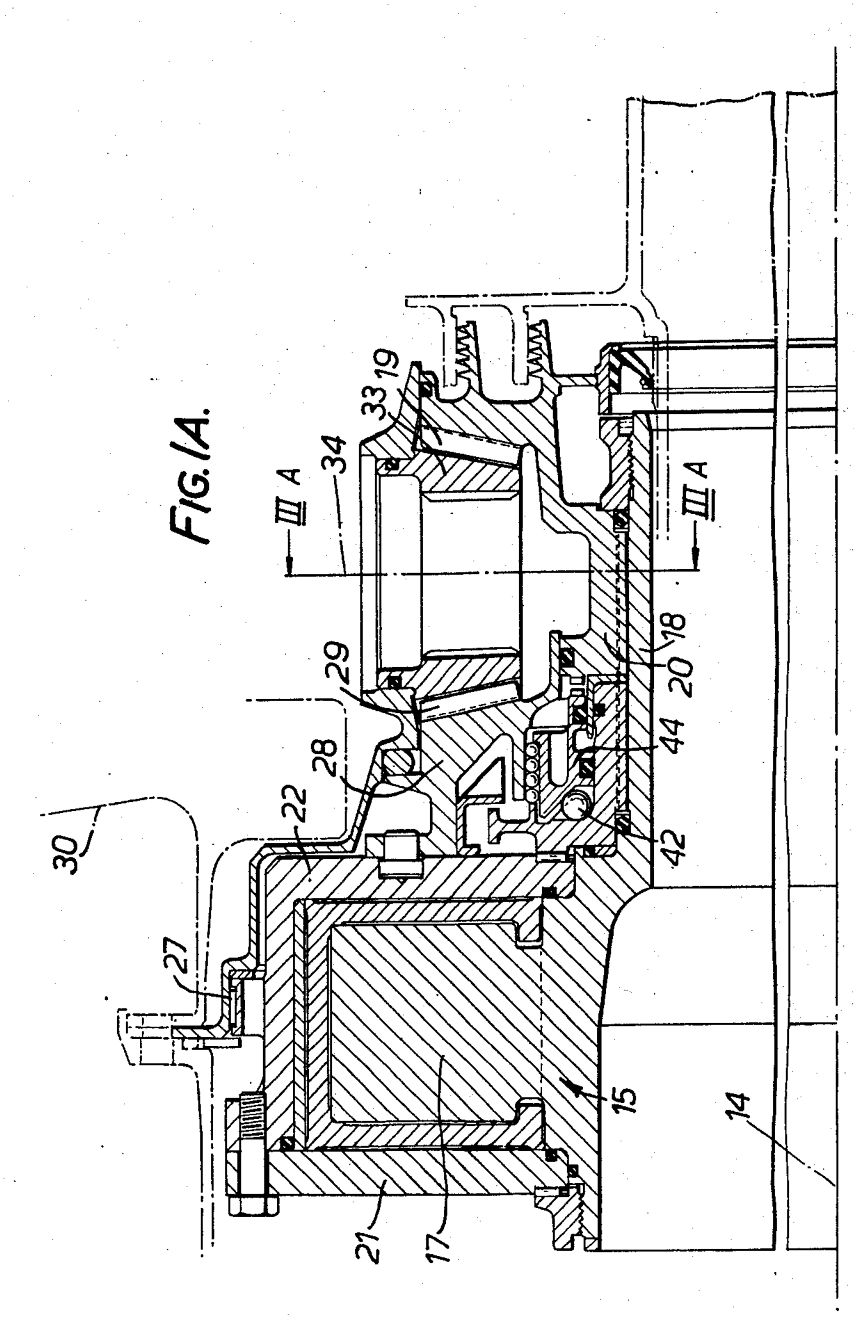

This invention relates to rotary actuators, suitable for use with rotors having flow-varying blading, for effecting adjustment of the blading.

According to the invention a rotary actuator, suitable for use with rotors having flow-varying blading, for effecting adjustment of the blading, includes two relatively-rotatable and co-axially-disposed main actuator components, abutment means carried by the first of said components and displaceable axially with respect to that component, further abutment means carried by and fast with respect to the second of said components, holding means operable for holding the displaceable abutment means out of engagement with respect to said further abutment means whereby relative rotational movement between the two components occurs when one of them moves in either one of its two directions of rotation, and controlling means, operative when said holding means is inoperative, for urging the displaceable abutment means into mechanical engagement with the further abutment means at any relative rotational position of said components, said engagement being such as to prevent relative rotational movement of the components as would otherwise occur with movement of said one component in one of its two directions of rotation, and being such as to permit relative rotational movement of the components arising from movement of said one component in the other of its said two directions.

The displaceable abutment means and said further abutment means may each comprise a ring of teeth of ratchet form, the rings of teeth being co-axially arranged and inter-engageable to afford a rotary ratcheting action.

The holding means may be movable to an operative position under fluid pressure, such movement being in opposition to said controlling means, the latter means automatically effecting said mechanical engagement upon loss of, or substantial reduction in, the fluid pressure applied to said holding means.

The actuator may be of vane-type and said main actuator components be of multi-vaned form.

Preferably the vane-type actuator is of the balanced kind generally as disclosed in the specification of U.S. Pat. No. 3,664,763.

Also according to the invention a rotor having flow-varying blading is provided with a rotary actuator for effecting adjustment of the blading, to vary flow of fluid over the blading, said actuator including two relatively-rotatable and co-axially-disposed main actuator components, abutment means carried by the first of said components and displaceable axially with respect to that component, further abutment means carried by and fast with respect to the second of said components, holding means operable for holding the displaceable abutment means out of engagement with respect to said further abutment means whereby relative rotational movement between the two components occurs when one of them moves in either one of its two directions of rotation, and controlling means, operative when said holding means is inoperative, for urging the displaceable abutment means into mechanical engagement with the further abutment means at any relative rotational position of said components, said engagement being such as to prevent relative rotational movement of the components as would otherwise occur with movement of said one component in one of its two directions of rotation, and being such as to permit relative rotational movement of the components arising from movement of said one component in the other of its said two directions.

The controlling means may comprise a plurality of balls or like elements which are so co-operable with said second component, or a part carried thereby, and which are so co-operable with a frusto-conical surface forming part of said holding means, that when the rotor is rotating and when the holding means is inoperative said balls or like elements are operable, under centrifugal force, to load said displaceable abutment means into its mechanical engagement with the further abutment means.

Figure 1B:
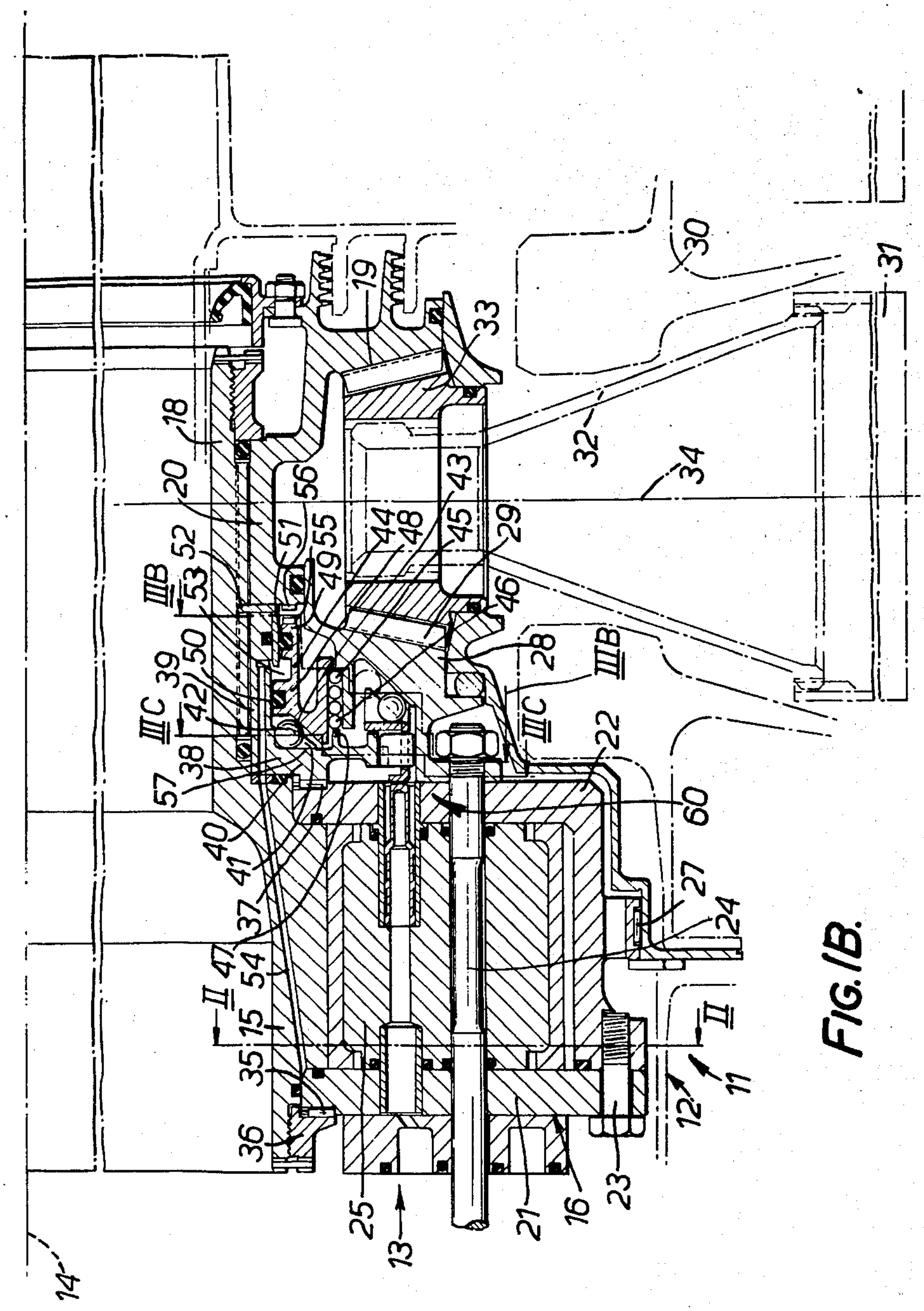
Figure 2:
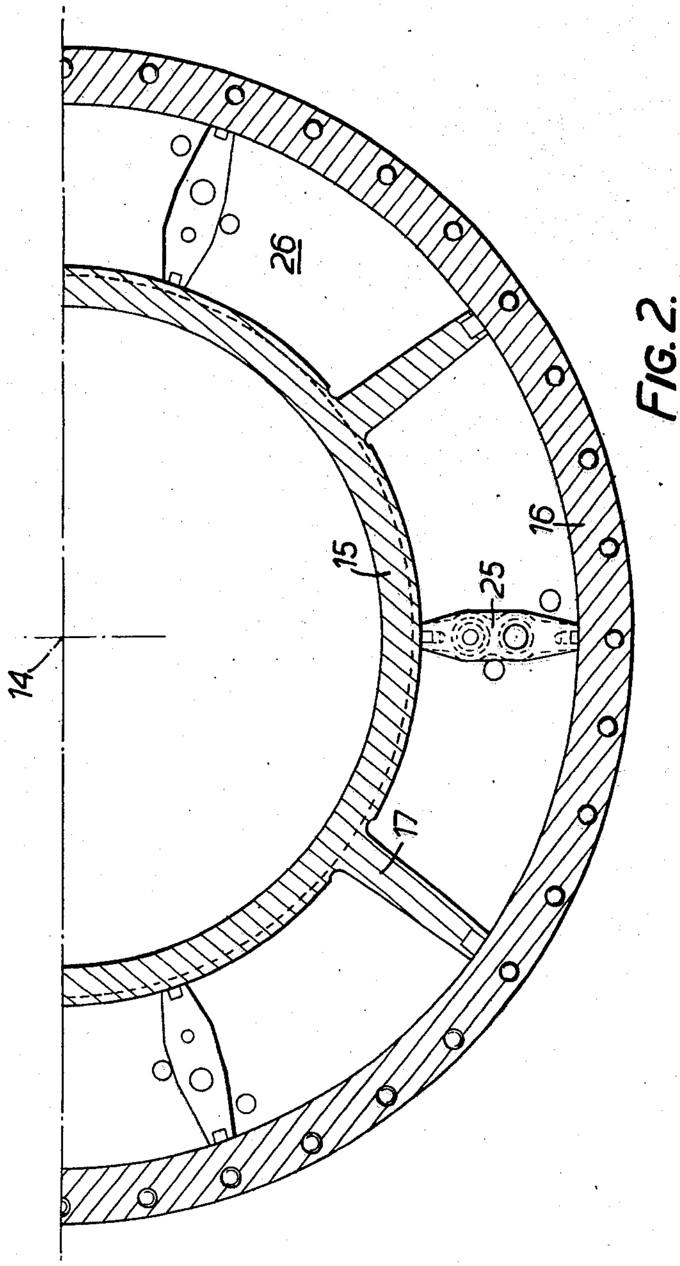
Figure 3:
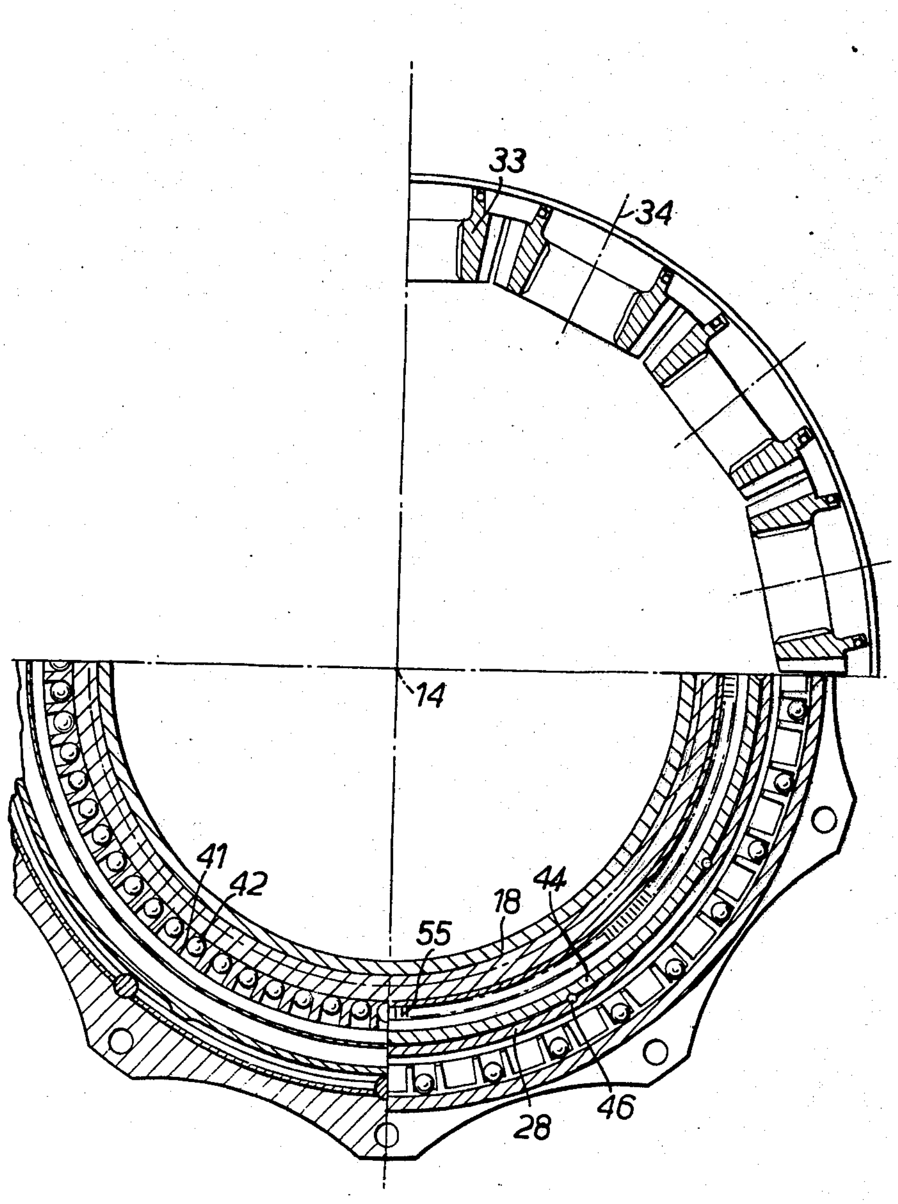

One embodiment of the invention will now be particularly described by way of example with reference to the accompanying drawings, of which, FIG. 1, comprising upper part A and lower part B, is a cross-sectional side elevation of a part of a bladed rotor having a rotary actuator for adjustment of the blading thereof, FIG. 2 is a cross-section taken along the line II — II on FIG. 1, this section being on a reduced scale, and, FIG. 3 shows three partial cross-sections, that in the upper right-hand quarter of the drawing being taken along the line IIIA — IIIA in FIG. 1, that in the lower right-hand quarter of the drawing being taken along the line IIIB — IIIB in FIG. 1, and that in the lower left-hand quarter of the drawing being taken along the line IIIC — IIIC in FIG. 1, the three sections being on a further reduced scale.

Referring to the drawings, a bladed rotor 11 suitable as the fan of an aircraft gas turbine engine of the ducted-fan by-pass type includes hub structure generally indicated at 12 within which is mounted a vane-type liquid-pressure-operable rotary actuator 13 whose rotational axis is coincident with the rotational axis 14 of the bladed rotor.

In the manner generally disclosed in the specification of U.S. Pat. No. 3,664,763, the actuator 13 is of balanced kind and comprises two main actuator components 15 and 16, of multi-vaned form, which are rotatable in either direction and oppositely, the one with respect to the other, about the axis 14. The component 15 is provided with five radially-outwardly-directed vanes 17 equi-spaced circumferentially of the component, and a shaft portion 18 thereof extends to the right in FIG. 1. A ring 19 of bevel gear teeth is formed upon a member 20 which is suitably-splined upon the shaft portion 18. The component 16 comprises two casing portions 21 and 22 bolted together as at 23 and bolted as at 24 to five radially-inwardly-directed vanes 25 interposed in circumferentially equi-spaced manner between those portions. In this way ten actuator chambers 26 are provided between the vanes 17 and 25.

The component 16 is supported in a bearing 27 of suitable plastics material so as itself to be relatively rotatable with respect to the hub structure 12.

Bolted to the casing portion 22 is an annular member 28 which carries a ring 29 of bevel gear teeth, the rings 29 and 19 having their axes both coincident with the axis 14, and the teeth of one ring facing those of the other ring as shown in FIG. 1.

Mounted in suitable bearings (not shown) each within a respective socket portion as at 30 of the hub structure 12 are fourteen fan blades, one of which is shown at 31. Each fan blade is connected by means of a splined member 32 to a respective bevel gear 33 in mesh at diametrically-opposed positions thereof with the teeth of the rings 19 and 29. Thus in the manner disclosed in the above-mentioned U.S. specification operation of the rotary actuator 13 effects rotary movement of all the bevel gears 33 in unison and thus effects adjustment of the blades 31 in either the fine pitch direction or the coarse pitch direction, as the case may be, about their longitudinal axes 34 to vary flow of air over the blades.

As also shown in FIG. 1, needle rollers 35 are provided between the casing portion 21 and a retaining ring 36 screw-threadedly engaged with the left-hand end portion of the component 15. Further needle rollers 37 are positioned as shown between the casing portion 22 and an annular member 38 generally of L-shaped cross-section which surrounds and is mounted fast upon the shaft portion 18.

At the junction of the axially-extending portion 39 of the member 38 and the radially-outwardly-directed portion 40 thereof that member is formed with a multiplicity of circumferentially equi-spaced pockets 41, in this embodiment there being seventy-two such pockets, each housing a respective ball 42. As shown in FIG. 1 each ball 42 is in engagement with a frusto-conical surface 43 formed upon an annular piston member 44 mounted within the annular member 28. Such mounting is afforded by the provision of twelve circumferentially equi-spaced and axially-directed rows 45 of balls 46, four balls being provided in each row in cooperating opposed channel recesses in piston member 44 and annular member 28 to prevent relative rotation therebetween. These rows of balls permit smooth axial sliding movement of the annular piston member 44. An annular axially-directed stop 47 is provided on the member 38 for the rows 45 of balls.

The annular piston member 44 comprises two radially-inwardly-directed lands 48 and 49. The land 48 incorporates a sealing ring 50 which is in sealing engagement with the exterior surface of the axially-extending portion 39 of the member 38. The land 49, which is of larger internal diameter than the land 48, also incorporates a sealing ring 51 which is in sealing engagement with a flanged insert 52 positioned as shown in FIG. 1. The annular chamber 53 formed between the lands 48 and 49 is communicable through passageways, as at 54, with a source of hydraulic liquid under pressure.

The annular piston member 44 forms liquid-pressure-operable holding means for displaceable abutment means 55 formed integrally with the piston member. The displaceable abutment means is co-operable with further abutment means 56 formed integrally with the member 20. Thus the construction is such that the displaceable abutment means 55 is carried by the member 28 and thus the component 16, being displaceable axially with respect to that component by the holding means 44, while the further abutment means 56 is carried by and held fast with respect to the component 15 by way of the shaft portion 18.

The displaceable abutment means 55 and the further abutment means 56 each comprises a ring of teeth of ratchet form, the rings of teeth having their axes coincident with the rotational axis 14 and being interengageable to afford a rotary ratcheting action.

In operation of the bladed rotor liquid under pressure is normally always supplied directly from a supply pump (not shown) through the passageways 54 to the chamber 53, and due to the different opposed end face areas of the lands 48 and 49 a differential pressure effect is produced which biasses the annular piston member 44 to the left in FIG. 1 to hold the abutment means 55 and 56 out of engagement. Under such conditions all the balls 42, which form controlling means, are positioned as shown in FIG. 1 at the radially-inner end portion of the frusto-conical surface 43, at the same time bearing against the wall 57 of the member 38.

With the abutment means 55 and 56 so disengaged, the vane-type rotary actuator is operable, under the control of suitable control valve means (not shown), by pressure liquid delivered by the supply pump. Upon such operation the components 15 and 16 rotate by equal amounts in opposite directions, this relative rotation producing a balanced driving effect, by way of the bevel gearing 19, 29 and 33, upon the blades to change their pitch. In this way the blades 31 are moved either in the pitch-coarsening direction or in the pitch-fining direction as required by the setting of the control valve means. For pitch-coarsening of the blades five alternate chambers 26 are chargeable with liquid under pressure while the other five chambers are placed in communication with drain, the component 15 thereby moving in one of its two directions of rotation while the component 16 moves in the opposite direction of rotation. Conversely said other five chambers 26 are chargeable with liquid under pressure for pitch-fining of the blades, while the first-mentioned five chambers are placed in communication with drain, the component 15 then moving in the other of its two directions of rotation, while the component 16 moves in the direction opposite thereto.

If, during operation of the bladed rotor, and at any relative rotational position of said components 15 and 16 a total loss of liquid pressure occurs in the passageways 54, or a loss of pressure below a predetermined value, for example, consequent upon inadvertent liquid leakage or failure of the liquid supply pump, the differential pressure effect biassing the annular piston member 44 to the left in FIG. 1 is lost whereupon centrifugal force acting upon the controlling means formed by the balls 42 drives them outwardly, in the direction away from the axis 14, moving along the surface 43. Since such movement is reacted by the wall 57 of the member 38, the annular piston member 44 is displaced to the right in FIG. 1 and thus the abutment means 55 moves axially into mechanical engagement with the abutment means 56. Such mechanical engagement results in the holding of the components 15 and 16 in their relative rotational position at which the failure has occurred, but since the teeth of the abutment means are of ratchet form, both components are still capable of being rotated under liquid pressure, the one in one only of its two directions of rotation and the other in the opposite direction thereto.

The rows 45 of balls 46 not only serve to provide smooth axial sliding movement of the annular piston member 44 with respect to the member 28 but these rows are so arranged that, when the abutment means 55 and 56 are in engagement, they form means through the intermediary of which torsional loading upon the annular piston member 44 is reacted by the member 28 and thus the component 16.

Upon such a condition of liquid pressure loss it is essential that the blades of the rotating rotor 11 should not be able to move in the pitch-fining direction, otherwise dangerous over-speeding of the rotor might occur. Thus the rings of ratchet teeth of the abutment means 55 and 56 are disposed in the rotational sense of their respective components in a manner such as to prevent pitch-fining. Therefore the relative rotational movement of the components 15 and 16 permitted by the ratchet teeth is that appropriate for pitch-coarsening action of the actuator to enable the blades then to be moved, if so required, to the feathered condition. Such movement to the feathered condition is effected by the operation of a feathering pump (not shown) separate from the supply pump. Thus, upon such failure occurring the feathering pump can be caused to deliver pressure liquid to the appropriate chambers 26 of the actuator 13, through suitable ducting, to feather the blades and thus place the rotor in a condition which imposes the least drag upon the associated aircraft when in flight.

The above-described holding of the components 15 and 16 afforded by inter-engagement of the abutment means 55 and 56 provides what is termed an "active lock" in that at any relative rotational position of the components the abutment means are readily-operable automatically to hold the components against pitch-fining operation in the event of loss of liquid pressure supply to the actuator. However, the rotary actuator may also have what is termed a "passive stop" and means forming such a stop, as disclosed in the Specification of my Application of even date herewith (Dowty Rotol Limited's Case No: E.2318), are generally indicated at 60 in FIG. 1.

The invention is not limited to rotary actuators of the balanced-vane-type as in other embodiments the rotary actuators may be of the non-balanced type in which one main actuator component is adapted for mounting fast with respect to a member, for example, the hub of a bladed rotor, while the other main actuator component is rotatable with respect to said one main component in either direction.

Again, the invention is not limited to actuators of the vane-type, as in other embodiments the rotary actuators may be of other type.

Finally, the invention is not limited to rotary actuators for bladed rotors as in other embodiments rotary actuators in accordance with the invention may with advantage be used with other devices where it is desirable to provide the actuators with similar abutment means engageable in similar manner.

I claim:

1. A rotary actuator, suitable for use with rotors having flow-varying blading, for effecting adjustment of the blading, including two relatively-rotatable and co-axially-disposed main actuator components, abutment means carried by the first of said components and displaceable axially with respect to that component, further abutment means carried by and fast with respect to the second of said components, axially-displaceable holding means associated with said displaceable abutment means, anti-friction elements through the intermediary of which said holding means and said displaceable abutment means are together carried by said first component in a manner so as to permit the axial displacement thereof with respect to that component but to prevent relative rotation between those means and that component, said holding means being constructed so that in its operative position it holds the displaceable abutment means out of mechanical engagement with respect to said further abutment means whereby relative rotational movement between the two components occurs when one of them moves in either one of its two directions of rotation, and controlling means co-operable with said holding means and operative when said holding means is inoperative, for loading the displaceable abutment means into mechanical engagement with the further abutment means at any relative rotational position of said components, said engagement being such as to prevent relative rotational movement of the components as would otherwise occur with movement of said one component in one of its two directions of rotation, and being such as to permit relative rotational movement of the components arising from movement of said one component in the other of its said two directions.

2. A rotary actuator, fitted to a rotor having flow-varying blading for effecting adjustment of the blading, including two relatively-rotatable and co-axially-disposed main actuator components the common rotational axis of which is co-incident with the rotational axis of the rotor, abutment means carried by the first of said components and displaceable axially with respect to that component, further abutment means carried by and fast with respect to the second of said components, fluid-pressure-operable holding means constructed so that in its operative position it holds the displaceable abutment means out of mechanical engagement with respect to said further abutment means whereby relative rotational movement between the two components occurs when one of them moves in either one of its two directions of rotation, and controlling means comprising a plurality of elements responsive to centrifugal force so that when the rotor is rotating and when, upon the occurrence of at least substantial reduction in fluid pressure applied to said holding means the holding means is inoperative, said elements are operable under centrifugal force to load the displaceable abutment means into mechanical engagement with the further abutment means at any relative rotational position of said components, said engagement being such as to prevent relative rotational movement of the components as would otherwise occur with movement of said one component in one of its two directions of rotation, and being such as to permit relative rotational movement of the components arising from movement of said one component in the other of its said two directions.

3. A rotor having flow-varying blading and provided with a single rotary actuator, the rotational axis of which is co-incident with the axis of rotation of the rotor, means for translating rotary output movement of said actuator into adjustment of the blading for varying flow of fluid over the blading, and said actuator including two relatively-rotatable and co-axially-disposed main actuator components, abutment means carried by the first of said components and displaceable axially with respect to that component, further abutment means carried by and fast with respect to the second of said components, holding means constructed so that in its operative position it holds the displaceable abutment means out of mechanical engagement with respect to said further abutment means whereby relative rotational movement between the two components occurs when one of them moves in either one of its two directions of rotation, and controlling means operable under centrifugal force thereon during rotation of the rotor, with said holding means inoperative, for loading the displaceable abutment means into mechanical engagement with the further abutment means at any relative rotational position of said components, said engagement being such as to prevent relative rotational movement of the components as would otherwise occur with movement of said one component in one of its two directions of rotation, and being such as to permit relative rotational movement of the components arising from movement of said one component in the other of its said two directions.

4. A rotary actuator, fitted to a rotor having flow-varying blading for effecting adjustment of the blading, including two relatively-rotatable and co-axially-disposed main actuator components, abutment means carried by the first of said components and displaceable axially with respect to that component, further abutment means carried by and fast with respect to the second of said components, fluid-pressure-operable holding means constructed so that when moved to its operative position under fluid pressure it holds the displaceable abutment means out of mechanical engagement with respect to said further abutment means whereby relative rotational movement between the two components occurs when one of them moves in either one of its two directions of rotation, and controlling means, operative when said holding means is inoperative and comprising a plurality of balls, a part carried by said second component and a frusto-conical surface forming part of said holding means, said balls being so co-operable with said part and said surface that when the rotor is rotating and when, upon at least substantial reduction in fluid pressure applied to said holding means, the holding means is inoperative, said balls are operable under centrifugal force automatically to load the displaceable abutment means into mechanical engagement with the further abutment means at any relative rotational position of said components, said engagement being such as to prevent relative rotational movement of the components as would otherwise occur with movement of said one component in one of its two directions of rotation, and being such as to permit relative rotational movement of the components arising from movement of said one component in the other of its said two directions.

5. An actuator as claimed in claim 1, wherein the actuator is of vane-type, and said axially-displaceable holding means is fluid-pressure-operable.

6. An actuator as claimed in claim 2, wherein said displaceable abutment means and said further abutment means each comprises a ring of teeth of ratchet form, the rings of teeth being co-axially arranged and inter-engageable to afford a rotary ratcheting action.

7. An actuator as claimed in claim 2, wherein the actuator is of vane-type and said main actuator components of multi-vaned form.

8. An actuator as claimed in claim 7, wherein said actuator is of the balanced kind.

9. An actuator as claimed in claim 2 and fitted to a bladed rotor for adjustment of the blading thereof.

* * * * *